(12) United States Patent
Shetty et al.

(10) Patent No.: US 9,088,937 B2
(45) Date of Patent: Jul. 21, 2015

(54) METHODS AND SYSTEMS FOR CAUSING A MOBILE STATION TO ORIGINATE A SUBSEQUENT CALL VIA A COVERAGE AREA OTHER THAN THAT USED FOR A FIRST CALL

(75) Inventors: Manoj Shetty, Overland Park, KS (US); Sachin Vargantwar, Overland Park, KS (US); Bhagwan Khanka, Lenexa, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 908 days.

(21) Appl. No.: 12/726,510

(22) Filed: Mar. 18, 2010

(65) Prior Publication Data
US 2011/0230191 A1    Sep. 22, 2011

(51) Int. Cl.
| | | |
|---|---|---|
| H04W 36/00 | (2009.01) | |
| H04W 48/20 | (2009.01) | |
| H04W 4/02 | (2009.01) | |
| H04L 29/08 | (2006.01) | |
| H04L 29/14 | (2006.01) | |
| H04W 28/04 | (2009.01) | |
| H04W 76/02 | (2009.01) | |
| H04W 76/04 | (2009.01) | |

(52) U.S. Cl.
CPC ............... *H04W 48/20* (2013.01); *H04L 67/18* (2013.01); *H04L 69/40* (2013.01); *H04W 4/021* (2013.01); *H04W 28/04* (2013.01); *H04W 76/02* (2013.01); *H04W 76/04* (2013.01)

(58) Field of Classification Search
CPC ..... H04W 48/20; H04W 4/021; H04W 76/04; H04W 28/04; H04W 76/02; H04L 69/40; H04L 67/18

USPC .......... 455/421–425, 432.1–444, 67.11–67.16
See application file for complete search history.

(56) References Cited

U.S. PATENT DOCUMENTS

| | | | | |
|---|---|---|---|---|
| 5,161,248 | A | * | 11/1992 | Bertiger et al. ................ 455/17 |
| 5,465,389 | A | * | 11/1995 | Agrawal et al. ............... 455/437 |
| 5,590,177 | A | * | 12/1996 | Vilmur et al. ................. 455/436 |
| 5,999,816 | A | * | 12/1999 | Tiedemann et al. ........... 455/437 |
| 6,075,989 | A | * | 6/2000 | Moore et al. .................. 455/436 |
| 6,192,240 | B1 | * | 2/2001 | Tayloe et al. ................. 455/428 |
| 6,389,285 | B1 | * | 5/2002 | Escamilla et al. ............ 455/438 |

(Continued)

FOREIGN PATENT DOCUMENTS

| | | |
|---|---|---|
| WO | 2006116618 | 11/2006 |
| WO | 2007020515 | 2/2007 |
| WO | 2007086679 | 8/2007 |

OTHER PUBLICATIONS

U.S. Appl. No. 12/818,585, filed Jun. 18, 2010.

*Primary Examiner* — Sharad Rampuria

(57) ABSTRACT

Methods and systems are provided causing a mobile station to, after experiencing a dropped call, originate a subsequent call via a coverage area different than that used for the first call. In an embodiment, a mobile station detects that, when it was engaged in the first call at a first location via a first wireless coverage area, the mobile station experienced the first call being dropped. When the mobile station subsequently attempts to originate a second call, the mobile station determines that its current location is within a threshold distance of the first location, and responsively attempts to originate the second call via a second wireless coverage area different from the first.

4 Claims, 2 Drawing Sheets

(56) References Cited

U.S. PATENT DOCUMENTS

| | | | |
|---|---|---|---|
| 6,445,918 B1* | 9/2002 | Hellander | 455/423 |
| 6,597,906 B1* | 7/2003 | Van Leeuwen et al. | 455/422.1 |
| 6,667,962 B1* | 12/2003 | Lee et al. | 370/335 |
| 6,721,572 B1* | 4/2004 | Smith et al. | 455/456.1 |
| 6,748,215 B1* | 6/2004 | Chen et al. | 455/434 |
| 6,980,811 B2 | 12/2005 | Harris | |
| 7,127,267 B2* | 10/2006 | McGowan et al. | 455/522 |
| 7,206,573 B1* | 4/2007 | Weaver et al. | 455/423 |
| 7,302,265 B1* | 11/2007 | Chalishazar et al. | 455/439 |
| 7,313,398 B1* | 12/2007 | Ramahi | 455/436 |
| 7,356,337 B2* | 4/2008 | Florence | 455/432.2 |
| 7,389,107 B1* | 6/2008 | Satapathy | 455/412.1 |
| 7,408,974 B2 | 8/2008 | Yarkosky | |
| 7,489,928 B2* | 2/2009 | Smith | 455/432.1 |
| 7,894,816 B1* | 2/2011 | Chalishazar et al. | 455/439 |
| 8,023,948 B2* | 9/2011 | Han | 455/440 |
| 8,107,988 B1* | 1/2012 | Shetty et al. | 455/522 |
| 8,195,204 B1* | 6/2012 | Shetty et al. | 455/458 |
| 8,244,255 B1* | 8/2012 | Oroskar et al. | 455/439 |
| 8,305,994 B1* | 11/2012 | Vargantwar et al. | 370/331 |
| 8,364,165 B2* | 1/2013 | Seacat et al. | 455/456.1 |
| 8,391,858 B1* | 3/2013 | Vargantwar et al. | 455/432.1 |
| 8,391,872 B1* | 3/2013 | Shetty et al. | 455/443 |
| 2002/0032034 A1* | 3/2002 | Tiedemann et al. | 455/437 |
| 2002/0107026 A1* | 8/2002 | Agrawal et al. | 455/453 |
| 2002/0137518 A1* | 9/2002 | Achour | 455/447 |
| 2003/0013441 A1* | 1/2003 | Bhogal et al. | 455/423 |
| 2004/0087305 A1* | 5/2004 | Jiang et al. | 455/432.1 |
| 2004/0203441 A1* | 10/2004 | Smith | 455/67.11 |
| 2004/0203645 A1* | 10/2004 | Forman et al. | 455/414.1 |
| 2005/0037758 A1* | 2/2005 | Rimoni | 455/436 |
| 2005/0192031 A1* | 9/2005 | Vare | 455/456.6 |
| 2005/0233749 A1* | 10/2005 | Karaoguz et al. | 455/442 |
| 2005/0252562 A1* | 11/2005 | Muller | 137/883 |
| 2006/0068805 A1* | 3/2006 | Rhemtulla et al. | 455/452.2 |
| 2008/0064400 A1* | 3/2008 | Benco et al. | 455/436 |
| 2008/0311915 A1* | 12/2008 | Lim et al. | 455/436 |
| 2009/0170519 A1* | 7/2009 | Wilhoite et al. | 455/436 |
| 2009/0325583 A1* | 12/2009 | Burgess et al. | 455/444 |

* cited by examiner

METHODS AND SYSTEMS FOR CAUSING A MOBILE STATION TO ORIGINATE A SUBSEQUENT CALL VIA A COVERAGE AREA OTHER THAN THAT USED FOR A FIRST CALL

BACKGROUND

A wireless communication network may include one or more base stations in communication with one or more mobile stations. Each mobile station can be any device that is capable of communication with one or more base stations, and each could take the form of a mobile phone, a personal digital assistant (PDA), a computer (such as a desktop computer, laptop computer, or tablet computer), an e-book reader, or any number of other forms.

The base stations may be networked together and typically include (or are connected to) an antenna. The base stations facilitate wireless communication between the mobile stations and other entities (such as mobile stations). Wireless communication may occur using radio frequency (RF) signals transmitted between the base stations and mobile stations. The wireless communication network could include a radio access network (such as a cellular access network), a wireless local area network, a wireless personal area network, and/or any other network capable of wireless communication.

The total communication capacity of a given base station may be increased by dividing what would otherwise be a single coverage area provided by the base station into two or more coverage areas, each of which may be defined by geographic location, RF carrier frequency ("carrier"), and/or one or more suitable distinguishing characteristics or parameters. For example, the coverage areas provided by a given base station could occupy substantially-non-overlapping geographic regions, each of which could effectively include on more coverage areas by virtue of service being provided by the base station on one or more carriers in that geographic region. A combination of one or more coverage areas may be collectively referred to as a coverage area. As used in the balance of this written description, the term "coverage area" refers to whatever collection of hardware, firmware, software, etc. is used by a base station to provide service on a given carrier in a given geographic region, and is not used hereinafter to refer to just the geographic region.

Communication between a base station and a mobile station typically includes two components: forward-link communication and reverse-link communication. Forward-link communication is communication that originates from a coverage area and is typically intended for a given mobile station. Reverse-link communication, on the other hand, is communication that originates from a given mobile station and is generally intended for a coverage area. In a CDMA network, as one example, each carrier is typically a pair of distinct frequencies—one for the forward link and the other for the reverse link. This approach is known as frequency division duplex (FDD).

Overview

At any given geographic location, a mobile station may be within range of more than one coverage area. In this situation, the mobile station may be served by the coverage area that facilitates the highest quality communication over the wireless communication network. The highest quality communication may be communication that results in the highest packet throughput, or in the case that the mobile station is able to facilitate voice communication, the fewest dropped calls, or perhaps the best voice quality. And other criteria may be considered instead and/or in addition to these examples.

The coverage area that is able to facilitate the highest quality communication is typically the coverage area with the strongest forward-link RF signal (perhaps as measured in decibels). In certain instances, however, this coverage area will not provide the highest quality communication even though it provides the strongest forward-link RF signal. For example, even though a mobile station is located at a position where the mobile station can receive a strong forward-link RF signal, the coverage area may receive, from the mobile station at that position, only a weak reverse-link RF signal, resulting in lower reverse-link packet throughput. As another example, even though the mobile station may receive a strong forward-link pilot-channel signal, the mobile station may receive only a weak forward-link traffic-channel signal. In either situation, the mobile station (or other entity) may incorrectly determine that the coverage area with the strongest forward-link RF signal provides the highest quality communication.

In some instances, a localized problem may prevent a coverage area with the strongest forward-link RF signal from providing the highest quality communication. For example, mobile station 108 illustrated in FIG. 1 may, while located at position LOC A, experience poor quality communication while being served by a coverage area provided by base station 102. The mobile station may experience poor quality communication at least in part because an obstruction 110 interferes with reverse-link communication between mobile station 108 and base station 102, even though the forward-link communication between the base station and the mobile station may be generally unaffected. If mobile station 108 moves only a small distance to LOC B, obstruction 110 may still interfere with communication between the mobile station and base station 102. However, the same obstruction 110 may not interfere with communication between mobile station 108 and base station 102 when the mobile station has moved at least a threshold distance 112 (with respect to its original LOC A) to LOC C.

Described herein are methods and systems for (i) detecting that, when a first mobile station was engaged in a first call via a first wireless coverage area and was located at a first geographic location, the first mobile station experienced the first call being dropped; (ii) when the first mobile station subsequently attempts to originate a second call, making a first determination that a current geographic location of the first mobile station is within a threshold distance of the first geographic location; and (iii) in response to making the first determination, causing the first mobile station to attempt to originate the second call via a second wireless coverage area different from the first. For example, according to the described methods and systems, if mobile station 108 detects that it experienced a first call being dropped when it was engaged in a first call and was located at LOC A, then when the mobile station attempts to originate a second call, it will not attempt the call via the first wireless coverage area if it is located at LOC A or LOC B, but may attempt the call via the first wireless coverage area if it located at LOC C.

It should be noted that the above overview is intended to be illustrative and not limiting. Additional and/or different features may be present in some embodiments. And any description of a base station, mobile station, or other network entity operating according to any particular protocol is by way of example and not limitation; any suitable wireless protocol(s) may be used, such as but not limited to 1×RTT CDMA, EV-DO, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other protocol now known or later developed.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

Figure 1:
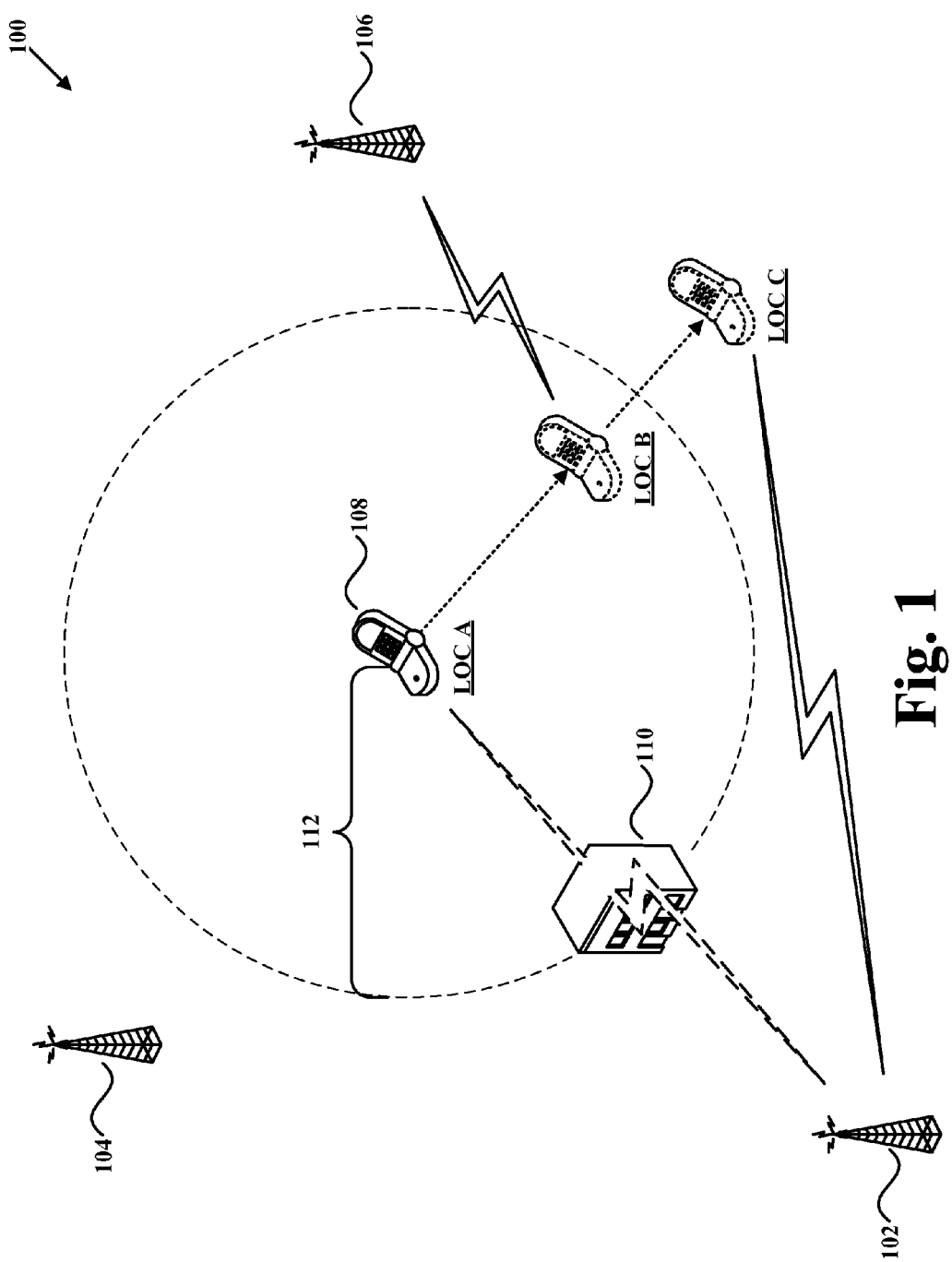
FIG. 1 depicts relative geographic positions of various elements of a wireless communication network, in accordance with exemplary embodiments.

FIG. 1 depicts the relative geographic positions of various elements of a wireless communication network, in accordance with exemplary embodiments. As shown in FIG. 1, a wireless communication network 100 includes base stations 102, 104, and 106, and mobile station 108. Also depicted are the obstruction 110 and the threshold distance 112. Note that additional entities not depicted in FIG. 1 could be present as well. As examples, wireless communication network 100 could include one or more of each of: a base station controller (BSC), a mobile switching center (MSC), a service provider network (SPN), a packet data serving node (PDSN), a low-cost internet base station (LCIB), an LCIB controller, an LCIB switch, a router, a media gateway, a virtual private network terminator (VPN-T), a public switched telephone network (PSTN), the Internet, additional base stations or mobile stations. Additional obstructions (for example, additional buildings) could be present as well.

Base stations 102, 104, and 106 may be any network elements arranged to carry out the base-station functions described herein. As such, they may include a communication interface, a processor, and data storage comprising instructions executable by the processor to carry out those base-station functions. The communication interface may include one or more antennas, chipsets, and/or other components for providing one or more coverage areas, such as cells and sectors, for communicating with mobile stations such as mobile station 108 over an air interface. The communication interface may also include one or more wired (e.g. Ethernet) and/or wireless (e.g. Wi-Fi) interfaces for communicating with other network entities. The data storage may be configured to store the geographic location of one or more mobile stations.

Mobile station 108 may be any device arranged to carry out the mobile-station functions described herein, and may include a user interface, a wireless-communication interface, a Global Positioning System (GPS) receiver and/or other location-determination device(s), a processor, and data storage comprising instructions executable by the processor for carrying out those mobile-station functions. The user interface may include buttons, a touchscreen, a microphone, and/or any other elements for receiving inputs from users, as well as a speaker, one or more displays, and/or any other elements for communicating outputs to users. The data storage may be configured to store the geographic location of the mobile station as determined by the GPS receiver and/or other location-determination device(s).

Obstruction 110 may be any obstruction capable of impacting forward-link and/or reverse-link communication between base station 102 and mobile station 108. Though obstruction 110 is depicted as a building, the obstruction could be any other man-made feature, such as a bridge, a dam, or a wall within a building, or a natural geographic or atmospheric feature, such as a mountain, trees, or weather conditions. Other obstructions are possible as well.

Threshold distance 112 is a minimum distance that mobile station 108 travels before attempting to originate a second call (after a first call was dropped) via the first wireless coverage area. Threshold distance 112 may be a predetermined distance that is always used by wireless communication network 100 or mobile station 108. Alternatively, threshold distance 112 may be determined by wireless communication network 100 and/or mobile station 108 based on the strength of the forward-link or reverse-link RF signal. Other criteria and/or input for determining and/or calculating threshold distance 112 are possible as well.

Figure 2:
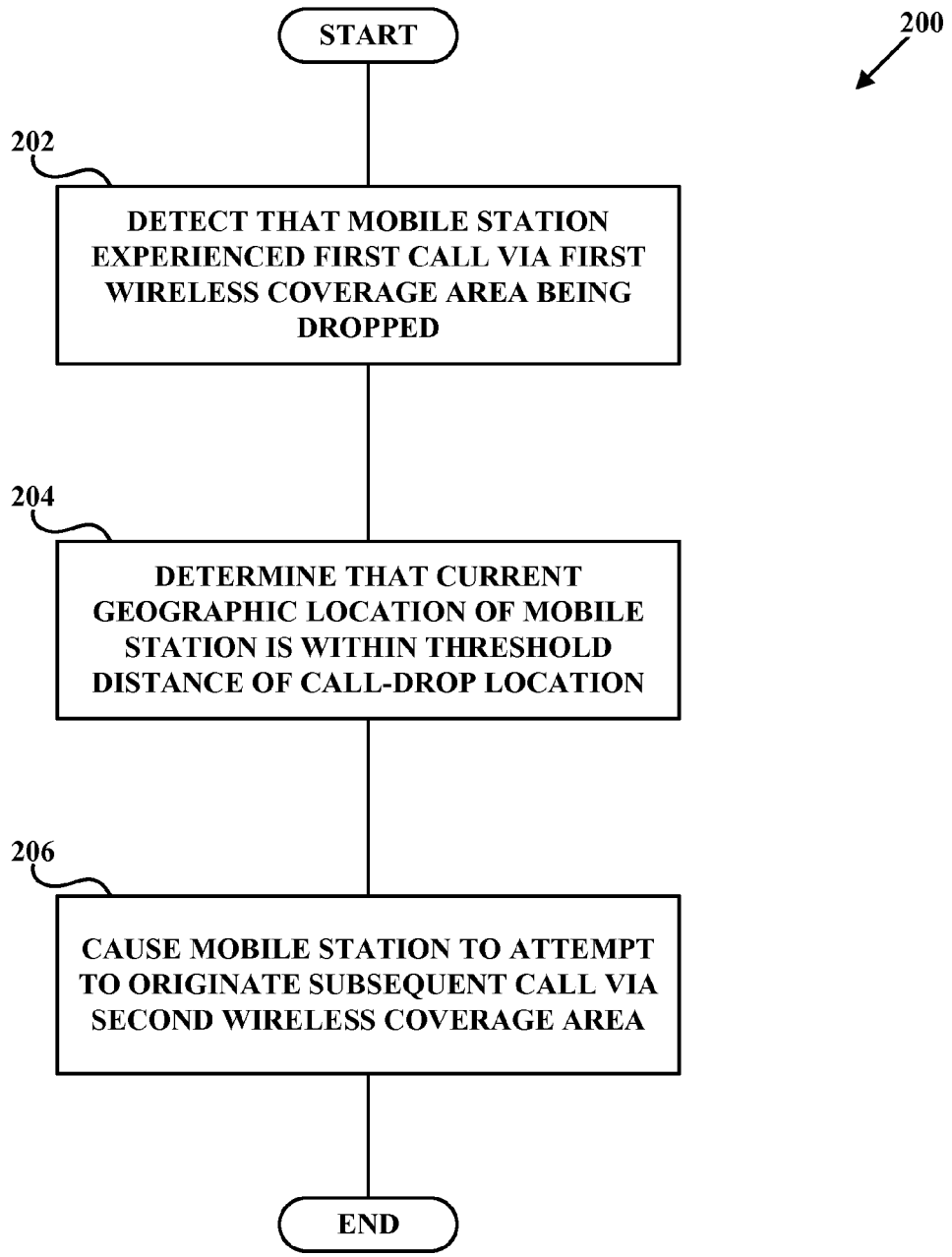
FIG. 2 is a flowchart of a method that can be carried out in accordance with exemplary embodiments.

FIG. 2 depicts a flowchart of a method, in accordance with exemplary embodiments. Though method 200 is described as being carried out by mobile station 108, the method can also be carried out by any entity within wireless communication network 100, including base stations 102, 104, and/or 106, a radio access network, a BSC, an MSC, any combination of the preceding entities, or any other entity, whether or not that entity is described as part of wireless communication network 100.

As shown in FIG. 2, method 200 begins at step 202 with mobile station 108 detecting that, when it was engaged in a first call via a first wireless coverage area and was located at a first geographic location, it experienced the first call being dropped. While a "call" may be a voice call via a mobile telephone, the call could also be a packet-data communication session between mobile station 108 and another network entity, or any other session of communication between mobile station 108 and any other entity.

The first call being dropped may include the first wireless coverage area being unable to successfully receive and/or decode communications from mobile station 108, and/or mobile station 108 being unable to successfully receive and/or decode communications from the first wireless coverage area. For example, the strength of the reverse-link communication sent by mobile station 108 may be too weak for the first wireless coverage area to be able to receive that communication. Even if the first wireless coverage area is able to receive the communication, the signal strength may be too weak for the coverage area to be able to perform signal processing on the received communication. Additionally or alternatively, the call being dropped could include mobile station 108 and/or the first coverage area successfully receiving and decoding communication, but determining that the strength of the received signal is below a predetermined threshold. Those having skill in the art will recognize that there may be other causes that alone or in combination contributed to the first call being dropped.

In response to detecting that mobile station 108 experienced the first call being dropped, the mobile station may determine and store the first geographic location. In an embodiment, mobile station 108 includes a GPS receiver, and determining the first geographic location includes determining the location using the GPS receiver. In another embodiment, determining the first geographic location includes determining the location based on the strength of a signal between mobile station 108 and one or more base stations, perhaps by comparing the signal strength between a plurality of base stations to triangulate the first geographic position.

Once mobile station 108 determines the first geographic location, the mobile station may store that location in a data storage of the mobile phone. The location may be stored as a set of coordinates, or may perhaps be stored in some other form. For example, mobile station 108 may determine that it is located at LOC A, and may then store the coordinates of LOC A in the data storage. Other ways of determining and storing the first geographic location are possible as well.

Method 200 continues at step 204 with mobile station 108 making a first determination, when mobile station 108 subsequently attempts to originate a second call, that a current geographic location of mobile station 108 is within a threshold distance 112 of the first geographic location. Making the first determination could include mobile station 108 comparing the current geographic location of the mobile station with the first geographic location. For example, if mobile station 108 stored the coordinates of LOC A in the data storage at step 202, then the mobile station may compare the stored coordinates with the coordinates of the current geographic location to determine whether the mobile station is still within threshold distance 112. If mobile station 108 is at location LOC B when it attempts to originate the second call, then the mobile station will make the first determination. However, if mobile station 108 is at location LOC C when it attempts to originate the second call, then it will not make the first determination, and the below described step 206 would not be carried out.

Method 200 continues at step 206 with, in response to making the first determination, causing mobile station 108 to attempt to originate the second call via a second wireless coverage area different from the first. For example, if mobile station 108 made the first determination, then it may not attempt to originate the second call via base station 102, but may instead attempt to originate the second call via a different base station (such as base station 104).

The first wireless coverage area may comprise a first set of wireless coverage areas, and the second wireless coverage area may comprise a second set of wireless coverage areas. In an exemplary embodiment, the first set of coverage areas does not equal the second set of coverage areas. For example, the first coverage area could comprise the set of base stations {102, 104}, and the second coverage area could comprise the set {102, 106}. Because the first set of coverage areas does not contain exactly the same coverage areas as the second set, the first set is not equal to the second set.

If the first set and the second set of wireless coverage areas each contain only one coverage area, then attempting to originate the second call via the second set of wireless coverage areas simply means attempting to originate the second call via a wireless coverage area different from the first wireless coverage area. If, however, the first set of wireless coverage areas contains more than one wireless coverage area, then it may be difficult to determine which of the wireless coverage areas may be responsible for mobile station 108 experiencing the first call being dropped. Accordingly, it may be advantageous for the second set of wireless coverage areas to contain even just one coverage area that is different from the first set of coverage areas, if only to determine that the problem wireless coverage area is still in the second set.

In an embodiment, the strongest coverage area may be in the first set of wireless coverage areas, but not in the second set. If the first and second coverage areas are each sector/carriers (i.e. a given carrier in a given sector), then the strongest sector/carrier may be in first set, but not the second set. For example, mobile station 108 or wireless communication network 100 may tend to facilitate communication via the coverage area with the strongest forward-link signal. Though intuition would dictate that the set of coverage areas providing service to the mobile station include the strongest coverage area, this coverage area may actually be the source of the mobile station experiencing the call being dropped. Accordingly, it may be desirable to attempt to establish the second call via a set of coverage areas that does not include the strongest coverage area.

In another embodiment, the weakest coverage area may be in the first set of wireless coverage areas, but not in the second set. If the first and second coverage areas are each sector/carriers, then the weakest sector/carrier may be in first set, but not the second set. For example, obstruction 110 could be the reason that the weakest coverage area is not able to provide a strong signal, and thus it may be desirable to attempt to establish the second call via a set of coverage areas that does not include the weakest coverage area.

In an exemplary embodiment, a new coverage area is in the second set of coverage areas, but not in the first set. For example, if all of the coverage areas in the first set of wireless coverage areas were the source of mobile station 108 experiencing the first call being dropped because of obstruction 110, then the second set should include a new coverage area that was not in the first set of coverage areas. By including the new coverage area, mobile station 108 may be able to facilitate communication via the new coverage area, and that communication may not be hindered by obstruction 110.

The first and second wireless coverage areas may occupy substantially-overlapping geographic areas. For example, if the coverage areas provided by a base station are not distinguished by geographic location, then the first and second wireless coverage areas provided by the base station may occupy substantially-overlapping geographic areas. As an additional example, if two base stations are located near each other, then a first wireless coverage area provided by the first base station may occupy a substantially-overlapping geographic area with a second coverage area provided by the second base station. Alternatively, the first and second wireless coverage areas may occupy substantially-non-overlapping geographic areas if, for example, the first coverage area is provided by a first base station, the second coverage area is provided by a second base station, and the two base stations are located at a distance from each other, or if the coverage areas provided by a base station are divided such that one coverage area does not substantially overlap another coverage area.

The first and second wireless coverage areas may operate on the same carrier frequency, or on different carrier frequencies. For example, the first and second wireless coverage areas may be provided by the same sector, but on different carriers within that sector. As another example, the first and second wireless coverage areas may be provided by different sectors, but both coverage areas could operate on the same carrier frequency. Other combinations of sectors and carriers are possible as well to provide one or more coverage areas.

The first and second wireless coverage areas may be provided by the same base station, or by different base stations. For example, the first and second wireless coverage areas may be provided by the same base station if the coverage areas of the base station are provided by sector/carriers, and the first sector/carrier is different from the second sector/carrier. As another example, the first and second wireless coverage areas may be provided by different base stations even though the first and second coverage areas may operate on the same carrier frequency.

In an embodiment in which method 200 is carried out at least in part by wireless communication network 100, subsequent to making the first determination, the network may make a second determination that a current geographic location of a second mobile station attempting to originate a third call is within the threshold distance of the first geographic location, and in response to making the second determination, cause the second mobile station to attempt to originate the third call via a wireless coverage area other than the first. Because wireless communication network 100 will have already determined that obstruction 110 may be the source of the first call being dropped, the network may be able prevent the second mobile station from attempting to originate the call via the first wireless coverage area, which is impaired by obstruction 110.

Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

We claim:

1. A method of operating a mobile station comprising:
   detecting dropped calls at a first geographic location using a first wireless carrier frequency;
   detecting the mobile station attempting to originate a call within a threshold distance of the first geographic location; and
   in response to detecting the dropped calls and the mobile station attempting to originate the call, originating the call over a second wireless carrier frequency that has a weaker signal at the mobile station than the first wireless carrier frequency;
   wherein the threshold distance is a predetermined distance between the first geographic location and a current location of the mobile station.

2. The method of claim 1, wherein the threshold distance is determined based on signal strength.

3. The method of claim 1, wherein originating the call over the second wireless carrier frequency in response to detecting the dropped calls at the first geographic location comprises detecting that the dropped calls at the first geographic location using the first wireless carrier frequency exceeds a threshold.

4. A mobile station comprising at least one processor and data storage having instructions executable by the at least one processor for causing the mobile station to:
   detect dropped calls at a first geographic location when using a first wireless carrier frequency;
   detect a subsequent call origination within a threshold distance of the first geographic location;
   in response to detecting the dropped calls and the subsequent call origination, originate the subsequent call over a second wireless carrier frequency that has a weaker signal at the mobile station than the first wireless carrier frequency;
   wherein the threshold distance is a predetermined distance between the first geographic location and a current location of the mobile station.

* * * * *